(12) United States Patent
Issel et al.

(10) Patent No.: US 10,647,043 B2
(45) Date of Patent: May 12, 2020

(54) PROTECTION DEVICE FOR AN INJECTION MOULDING MACHINE

(71) Applicant: ZHAFIR PLASTICS MACHINERY GMBH, Ebermannsdorf (DE)

(72) Inventors: Dirk Issel, Lauf (DE); Iwo Hausdörfer, Kümmersbruck (DE); Steffen Franz, Amberg (DE); Jörg Meyer, Kümmersbruck (DE); Andreas Fensterer, Amberg (DE)

(73) Assignee: Haitian Plastics Machinery Group Co., Ltd., Ningbo, Zhejiang Province (CN)

( * ) Notice: Subject to any disclaimer, the term of this patent is extended or adjusted under 35 U.S.C. 154(b) by 247 days.

(21) Appl. No.: 15/549,816

(22) PCT Filed: Jan. 22, 2016

(86) PCT No.: PCT/EP2016/051390
§ 371 (c)(1),
(2) Date: Aug. 9, 2017

(87) PCT Pub. No.: WO2016/128204
PCT Pub. Date: Aug. 18, 2016

(65) Prior Publication Data
US 2018/0029275 A1    Feb. 1, 2018

(30) Foreign Application Priority Data

Feb. 10, 2015  (DE) .................. 10 2015 101 852

(51) Int. Cl.
*B29C 45/84*    (2006.01)
*B29C 45/17*    (2006.01)

(52) U.S. Cl.
CPC ...... *B29C 45/84* (2013.01); *B29C 2045/1797* (2013.01)

(58) Field of Classification Search
CPC ..... B29C 45/84; B29C 2045/1797; F16P 3/08
See application file for complete search history.

(56) References Cited

U.S. PATENT DOCUMENTS

| 1,751,807 A | * | 3/1930 | Ford | ...................... A47G 5/04 |
| | | | | 160/183 |
| 3,877,859 A | * | 4/1975 | Grazine | .................. B29C 45/84 |
| | | | | 425/152 |

(Continued)

FOREIGN PATENT DOCUMENTS

| DE | 92 17 420.5 U1 | 4/1993 |
| DE | 199 49 958 A1 | 4/2001 |
| JP | 2003-25405 A | 1/2003 |

OTHER PUBLICATIONS

Written Opinion issued in PCT/EP2016/051390 dated Mar. 23, 2016 (6 pages).

(Continued)

*Primary Examiner* — Joseph S Del Sole
*Assistant Examiner* — Jerzi H Moreno Hernandez
(74) *Attorney, Agent, or Firm* — Flynn Thiel, P.C.

(57) ABSTRACT

An injection moulding machine comprising a fixed tool clamping plate, a movable tool clamping plate and a protection device comprising lateral frame elements or lateral covers, wherein the clamping plates are arranged between the lateral frame elements or the lateral covers and the movable tool clamping plate can travel along a closing axis which runs parallel to the lateral frame elements or the lateral covers in relation to the fixed tool clamping plate, wherein the protection device further comprises first cover elements arranged on the top side of the machine, both on an operator side and on the operator opposite side, which first cover elements extend parallel to the closing axis, the first cover elements being configured for a radial movement, and wherein the protection device further comprises second (Continued)

cover elements on the top side of the machine which extend perpendicularly to the closing axis, wherein the second cover elements being configured for radial movement.

10 Claims, 4 Drawing Sheets

(56) References Cited

U.S. PATENT DOCUMENTS

| | | | | |
|---|---|---|---|---|
| 3,902,582 | A * | 9/1975 | Cross | B29C 45/84 |
| | | | | 192/135 |
| 4,088,157 | A * | 5/1978 | Chen | D03D 49/022 |
| | | | | 139/1 R |
| 4,382,763 | A * | 5/1983 | Hehl | B29C 45/84 |
| | | | | 425/153 |
| 5,017,121 | A * | 5/1991 | Hehl | B29C 45/1769 |
| | | | | 425/151 |
| 6,655,947 | B1 | 12/2003 | Hehl | |
| 2008/0263961 | A1 * | 10/2008 | Nishimura | B29C 45/84 |
| | | | | 49/449 |
| 2016/0016344 | A1 * | 1/2016 | Tanemura | B29C 45/1755 |
| | | | | 425/542 |
| 2016/0288393 | A1 * | 10/2016 | Tanaka | B29C 45/77 |

OTHER PUBLICATIONS

International Search Report issued in PCT/EP2016/051390 dated Mar. 23, 2016 with English translation (5 pages).

* cited by examiner

PROTECTION DEVICE FOR AN INJECTION MOULDING MACHINE

The invention relates to a protection device for an injection moulding machine with lateral frame elements or lateral covers as well as a fixed tool clamping plate and a movable tool clamping plate, wherein the fixed tool clamping plate and the movable tool clamping plate are arranged between the lateral frame elements or the lateral covers and the movable tool clamping plate can travel along a closing axis which runs parallel to the lateral frame elements or lateral covers in relation to the fixed tool clamping plate.

Protection devices according to the preamble of the main claim have been known in the state of the art for a considerable time. The requirements for the operational safety of injection moulding machines are stipulated across nations in several standards and regulations. Thereby, particular emphasis is laid on the European Standard EN 201:2009.

The movement of a movable tool clamping plate against a fixed tool clamping plate for closing the two mould halves during an injection moulding process constitutes an area of risk due to the high forces of the moving parts. For this reason, it is required that this area be shielded from all sides, from which a person present in the periphery of the injection moulding machine may intervene, i.e. both from the operator side and the side opposite the operator as well as from the upper and lower sides of the injection moulding machine, by a protection device, so that it is not possible to intervene in the area of risk during operation. Thereby, the protection device must be either configured such that it cannot be removed during a running operation or configured such that the opening of the protection device during operation is detected by a safety mechanism and the dangerous movement is stopped.

It has become standard practice to affix movable protection doors on the operator side and the side opposite the operator at the position of the tool area, since access to the tool area can be easily established for the removal of parts and/or for maintenance. The protection device on the top side of the machine can be configured such that a cover is fixedly attached to the lateral frame elements or the lateral covers so that it cannot be removed during operation. However, this involves the disadvantage of a high lack of flexibility relating to tool change and automated removal of parts, since such a cover must be completely disassembled and subsequently reassembled. Another possibility is to configure the cover on the top side, analogous to the operator side and the side opposite the operator, as a movable protection door. However, the advantage of the high flexibility also involves here the disadvantage that an additional safety mechanism is required to determine if the protection door on the top side is open or closed.

JP 2003025405 A describes a protection device for an injection moulding machine, which is built as a single piece and overspans the tool area similar to a bridge. Consequently, only one single protection device is provided, which can travel along the closing axis and covers both the operator side and the side opposite the operator as well as the top side of the machine. In this manner, only one safety mechanism is required for determining the state of the protection device. However, it is disadvantageous that the bridge-like cover has a high dead weight and also that it is expensive to produce and not suitable for an operation involving automated removal of parts.

Likewise, a one-piece protection device in the form of a bridge is known from DE 09217420 U1, which is supported on the rear end of a closing mechanism such that it can be displaced in the longitudinal direction of the machine body. In the open state, the protection device is at a right angle to the closing axis and can be displaced in the form of a protection hood via the closing mechanism, so that the tool area and the movable parts are completely covered during operation of the machine. However, such a configuration also presents the disadvantages already disclosed in the previous paragraph.

Therefore, the underlying problem of the invention is to provide a protection device for an injection moulding machine which satisfies all security requirements and is flexible in its application as well as easy and cost-effective to produce.

For solving the problem, according to the invention it is provided to further develop a protection device of the type mentioned above such that a plurality of first cover elements is arranged on the top side of the injection moulding machine, both on an operator side as well as on the operator opposite side which is opposite the operator side, which first cover elements extend parallel to the closing axis, wherein the arrangement of the first cover elements is configured such that a radial movement of the first cover elements is possible and, on the top side of the injection moulding machine, a plurality of second cover elements is arranged which extend perpendicularly to the closing axis, wherein the arrangement of second cover elements is configured such that a radial movement of the second cover elements is possible.

The underlying finding of the invention is to affix a plurality of first cover elements on the top side of the injection moulding machine, both on the operator side as well as on the operator opposite side, which run parallel to the closing axis and thus also parallel to the lateral frame elements or lateral covers, and to affix a number of second cover elements on the top side of the injection moulding machine, which extend perpendicularly to the injection axis and thus run between the lateral frame elements or lateral covers. Thereby, one cover element can be provided on each side respectively, so that a total number of two first cover elements and two second cover elements results. However, it is possible, without further ado, to affix two or more cover elements on each side, so that the total number of first cover elements and second cover elements is accordingly increased.

According to the invention, the first cover elements and second cover elements are arranged such that they can be radially moved, wherein the rotation axis of the first cover elements lies in parallel to the closing axis and the rotation axis of the second cover elements lies perpendicular to the closing axis. Thus, it is possible to position the first cover elements and second cover elements such that together they cover the tool area located between the fixed tool clamping plate and the movable tool clamping plate from the top side of the machine, so that it is not possible for a person present in the periphery of the machine to intervene in the area of risk during operation. In this closed state of the protection device, the first cover elements and second cover elements overlap, wherein both an embodiment of the invention, in which the first cover elements lie under the second cover elements in a closed state, as well as an embodiment of the invention, in which the first cover elements lie over the second cover elements in a closed state, are possible.

Access to the tool area can be established by an upward radial movement of the first cover elements and second cover elements, e.g. in the form of a simple unfolding, so that a change of tool halves located on the fixed tool clamping plate and movable tool clamping plate as well as the possibility of intervention of peripheral devices for automated removal of parts is easily possible. The first cover elements and the second cover elements thereby protrude upwards, i.e. the first cover elements form a vertical extension of the lateral frame elements or lateral covers on the operator side and the side opposite the operator, and the second cover elements connect the vertical extension formed by the first cover elements to a safety guard completely enclosing the tool area. However, even in this open state of the protection device, it is not possible for a person present in the periphery of the injection moulding machine to intervene, since in case of an attempt to intervene in the form of reaching out to the lateral frame elements or the lateral covers, the respective first or second cover element unfolds downwards and thus covers the tool area at the appropriate place.

Thus, the protection device according to the invention also involves the advantage that both in a closed as well as in an open state, it is not possible for a person present in the periphery of the injection moulding machine to intervene from outside. Therefore, a safety mechanism that detects the state of the protection device and stops the dangerous movement in case of an open protection device can be dispensed with. This leads to a significant reduction in cost in comparison with protection devices known in the state of the art. Furthermore, the protection device according to the invention is simple and flexible in its possible applications, since the protection device can be opened or closed merely by unfolding or folding down the first cover elements and second cover elements. The open state of the protection device according to the invention presents the particular advantage that, at the same time, access to the tool area is established, however, intervention in the area of risk is eliminated. The area accessible to the tool area resulting from an open protection device is sufficiently large to facilitate a change of the tool halves as well as machine operation with peripheral devices for the automated removal of parts.

In a particularly preferable manner, the arrangement of first cover elements and second cover elements can take place such that, in a closed state of the protection device, the distance between the rotation axes of second cover elements and the adjoining horizontal ends of first cover elements is within a range of 1 mm and 15 mm. In this area, in the case of an open protection device, the clearance between two adjacent cover elements is so small that it is not possible for a person present in the periphery of the machine to intervene from outside. If the distance increases beyond the upper limit defined as preferred, the clearance between two adjacent cover elements also increases automatically, so that intervening is possible if need be and sufficient protection can no longer be guaranteed.

In a preferred embodiment of the present invention, the first cover elements and the second cover elements are fixed to the lateral frame elements or the lateral covers via connecting elements. However, there is also the possibility of providing traverses, struts or panels between the lateral frame elements or lateral covers, which serve for fixing the first cover elements and/or the second cover elements via connecting elements. However, due to the flexibility of the present invention, it is not necessary to restrict it to one of the two variants. It is in fact possible to combine both fixing variants at will. Thus, e.g. the first cover elements can be fixed via connecting elements to the lateral frame elements or lateral covers, while the second cover elements are fixed respectively via connecting elements to the traverses or protection panels which run between the lateral frame elements or lateral covers.

Preferably, hinges are provided as connecting elements between the first or second cover elements and the lateral frame elements or lateral covers, traverses, struts or panels, since they guarantee the radial movement required according to the invention and, as standard parts, can be obtained in a simple and cost-effective manner. The particularly preferred hinges are designed such that they facilitate an opening angle in the range of 91° and 100° in case they strike on the side oriented to the tool area of a lateral frame element, a traverse or a panel. This range is advantageous, since the first cover elements and second cover elements are kept by gravitational force in the open state after being unfolded and thus a separate holding mechanism is not required. Additionally, when the protection device is open, in this range for opening angles, the clearance between two adjacent cover elements is so small that it is not possible for a person present in the periphery of the machine to intervene from outside. If the opening angle increases beyond the upper limit defined as preferred, the clearance between two adjacent cover elements also increases automatically, so that intervening is possible if need be and sufficient protection can no longer be guaranteed. However, the invention is not limited to a striking of hinges on the side of a lateral frame element adjacent to the tool area, a traverse or a panel; if a different striking is provided, then the preferred range for opening angles must be accordingly adjusted. The selection of connecting elements is not limited to hinges; in fact, within the scope of the present invention, all connecting elements can be used, with which a radial movement of first cover elements and second cover elements can be guaranteed.

Holding devices can be provided on the lateral frame elements or lateral covers, traverses, struts or panels, which form a contact surface for the first and/or second cover elements and thus restrict their radial movement paths in both rotational directions. In a preferred manner, a first plurality of holding devices is arranged such that the first cover elements and second cover elements in a closed state are supported on the protection device on the first number of holding devices such that they are at right angle to the lateral frame elements or lateral covers. In a particularly preferred manner, a second plurality of holding devices is arranged such that, in an open state of the protection device, the first cover elements and second cover elements rest on the second plurality of holding devices such that the opening angle of the cover elements lies in the preferred range between 91° and 100°.

The first cover elements and second cover elements can be preferably made of steel plate, wherein a material strength in the range of 1.5 mm and 4 mm has proved to be particularly suitable. However, the present invention is not restricted to steel plate as the material used for the first cover elements and second cover elements. In fact, it is possible to use any material that proves to be suitable for this purpose. In a particularly preferred embodiment of the invention, handling devices are arranged on the first cover elements and second cover elements, which facilitate easy opening and closing of the protection device for an operator. In a particularly preferable embodiment of the invention, the first cover elements and second cover elements are dimensioned such that, in the open state of the protection device, the safety guard formed by them has one large vertical extension of the machine height such that the upper end of the first cover elements and second cover elements cannot be reached by a person present in the periphery of the injection moulding machine even with arm outstretched.

In a further advantageous embodiment of the invention, the first cover elements and second cover elements have locking devices. While operating an injection moulding machine, dynamic loads naturally act, generally upon the machine parts and also specifically on the protection device, due to the clamping forces as well as the moving parts. This may lead to the first cover elements and second cover elements oscillating during the operation, which results in an undesired increase in noise level and material wear and, at worst, in an undesired closing of first or second cover elements. For this reason, lugs can be provided e.g. on the first cover elements and drill holes on the second cover elements. In this manner, in the open state of the protection device, two adjacent first cover elements and second cover elements can be locked to each other, respectively, e.g. with the help of a nut and bolt connection, by which the protection device forms a rigid system and avoids the mentioned disadvantages. This is advantageous, particularly in a machine operation involving the automated removal of parts in which the protection device is always in an open state and a peripheral device reaches the tool area from above, since an unwanted closing of at least one of the first or second cover elements can lead to damage of the peripheral device. However, the invention is not limited to such a locking. In fact, the locking of the first cover elements and second cover elements can take place in every suitable manner.

Additionally, the invention relates to an injection moulding machine with such a protection device.

Additional advantages and details of the present invention are reported based on the exemplary embodiments with reference to the drawings. The drawings are schematic representations. In the figures.

Figure 1:
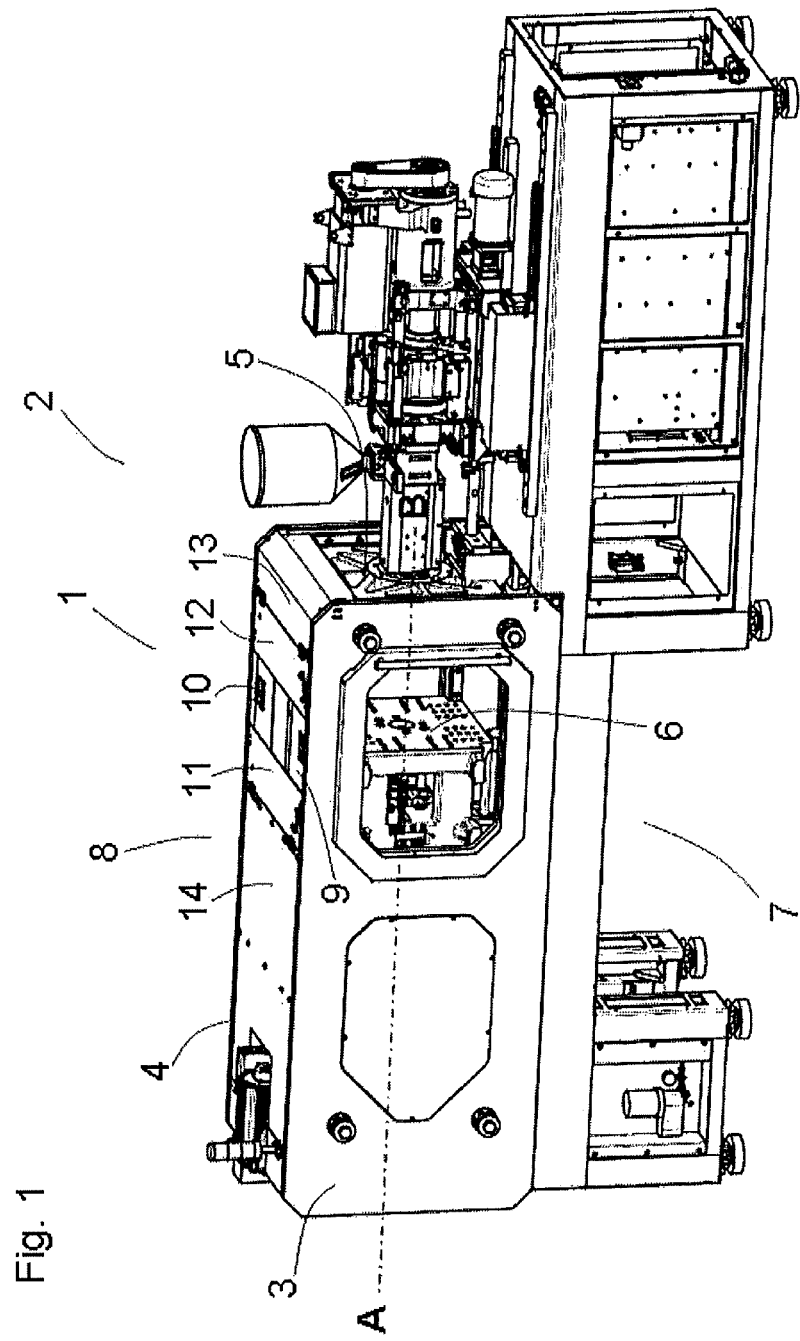
FIG. 1 shows a perspective representation of a protection device according to the invention in a closed state.

FIG. 1 shows a protection device 1 for an injection moulding machine 2 with lateral frame elements 3, 4 in a closed state. The injection moulding machine 2 comprises a fixed tool clamping plate 5 and a movable tool clamping plate 6, wherein the movable tool clamping plate 6 can travel along a closing axis A-B which lies in parallel to the lateral frame elements 3, 4 in relation to the fixed tool clamping plate 5. Fixed protection panels 13, 14 are affixed between the lateral frame elements 3, 4, which cover the movable parts of a driving mechanism which is not represented in detail.

First cover elements 9, 10 are fixed to the lateral frame elements 3, 4 on an operator side 7 and on an operator opposite side 8 such that they can be moved radially. The first cover elements 9, 10 are positioned such that they lie at a right angle to the inside of lateral frame elements 3, 4, i.e. they lie flat on the top side of the injection moulding machine 2. Second cover elements 11, 12 are arranged between the lateral frame elements 3, 4. The second cover elements 11, 12 are fixed to the protection panels 13, 14 such that they can be moved radially and also lie rectangular to the inside of lateral frame elements 3, 4 and, consequently, flat on the surface of the injection moulding machine 2, so that they overlap the first cover elements 9, 10. The first cover elements 9, 10 and the second cover elements 11, 12 together form, on the top side of the injection moulding machine 2, a cover for the tool area located between the fixed tool clamping plate 5 and the movable tool clamping plate 6, so that an intervention in the tool area from outside in the form of a reaching out to the lateral frame elements 3, 4 is not possible for a person present in the periphery of the injection moulding machine 2.

Figure 2:
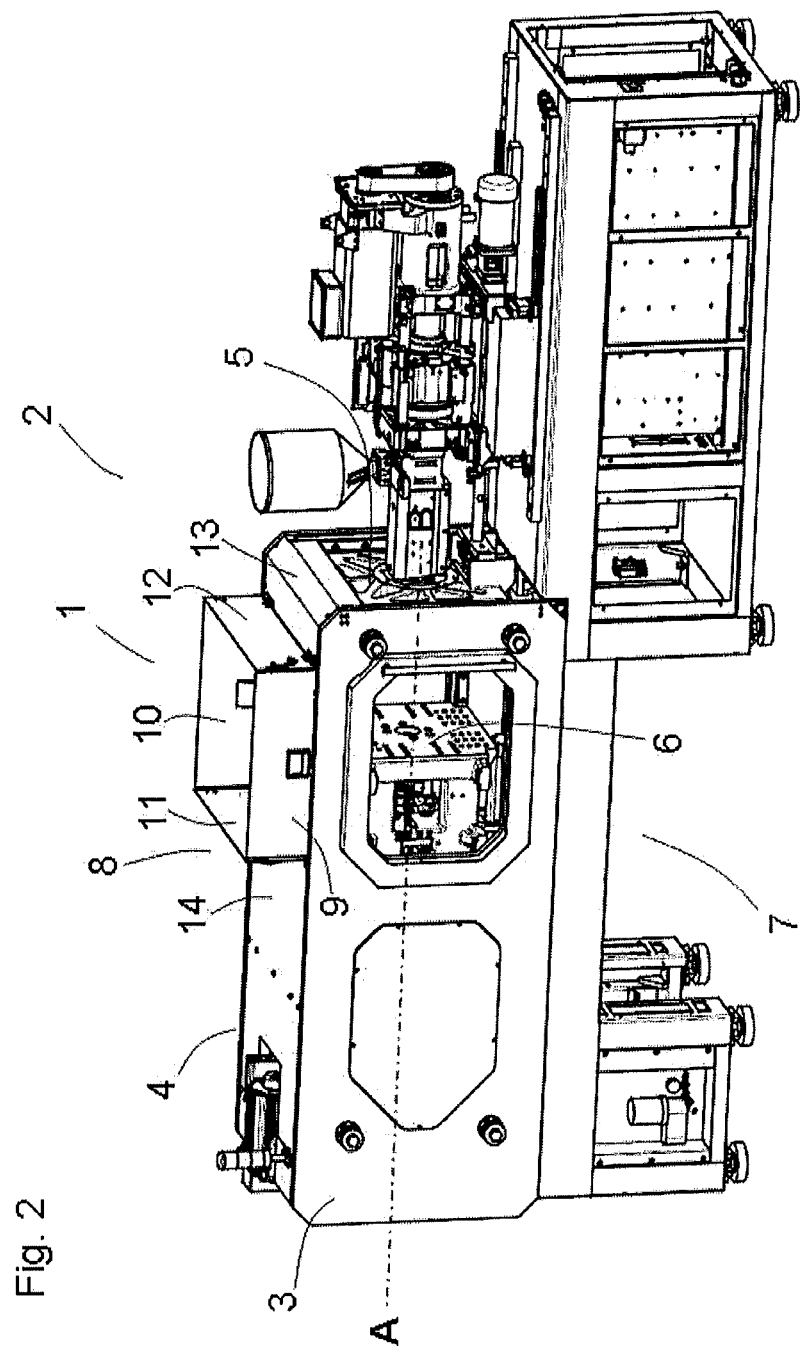
FIG. 2 shows a perspective representation of the protection device from FIG. 1 in an open state.

FIG. 2 is a perspective view of the protection device 1 from FIG. 1 in an open state. It can be seen that, by the means of a radial movement of the first cover elements 9, 10 as well as the second cover elements 11, 12 upwards, e.g. in the form of an unfolding, access to the tool area located between the fixed tool clamping plate 5 and the movable tool clamping plate 6 was established. The first cover elements 9, 10 form a vertical extension of lateral frame elements 3, 4 on the operator side 7 and the operator opposite side 8. The resulting vertical extensions of the lateral frame element 3 through the first cover element 9 as well as the lateral frame element 4 through the first cover element 10 are connected to each other through the second cover elements 11, 12. In this manner, a safety guard completely enclosing the tool area results, which ensures access to the tool area from the top side and which, however, prevents an intervention by a person present in the periphery of injection moulding machine at the same time, since upon an attempt at intervention, the respective first or second cover element folds down and thus covers the tool area at the appropriate location.

Figure 3:
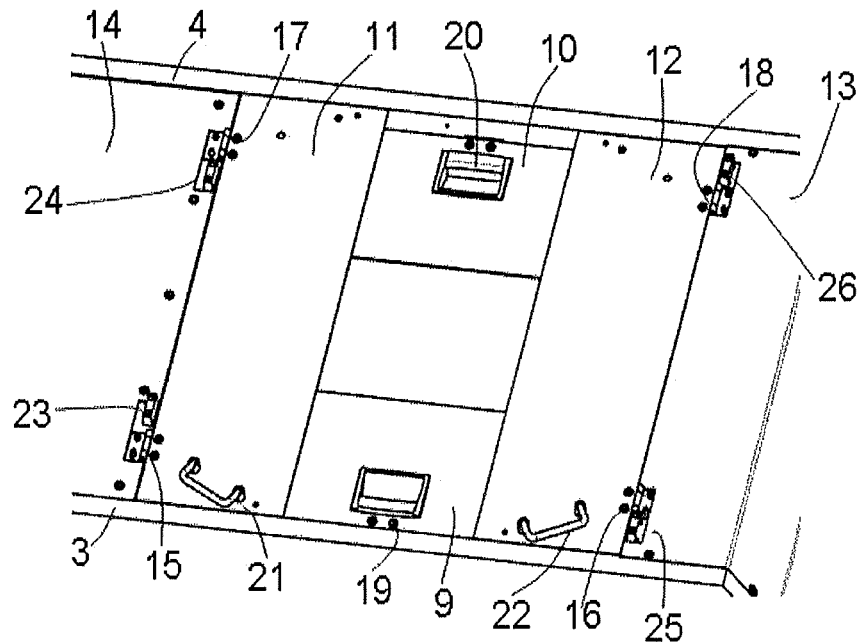
FIG. 3 shows a close-up view of the protection device from FIG. 1 in a closed state.

FIG. 3 shows a close-up view of the protection device 1 from FIG. 1 in a closed state. It can be seen that the second cover elements 11, 12 are fixed to the protection panels 13, 14 via hinges 15, 16, 17, 18. Likewise, the first cover elements 9, 10 are fixed to the lateral frame elements 3, 4 via hinge connections; however, these hinge connections are not visible due to the perspective chosen in FIG. 3. Nevertheless, the invention is not limited to the fixing of the second cover elements 11, 12 to the protection panels 13, 14 reported within the frame of this exemplary embodiment. The second cover elements 11, 12 can also be fixed without further ado to the lateral frame elements 3, 4 or other machine parts. Handling devices 19, 20, 21, 22 are affixed on the first cover elements and second cover elements 9, 10, 11, 12, which facilitate an easy moving of the first cover elements and second cover elements 9, 10, 11, 12 for opening and closing the protection device. The protection panels 13, 14 present holding devices 23, 24, 25, 26 which serve for restricting the radial movement path of the second cover elements 11, 12 and thus for adhering to the preferred opening angle of the protection device 1 in an open state.

Figure 4:
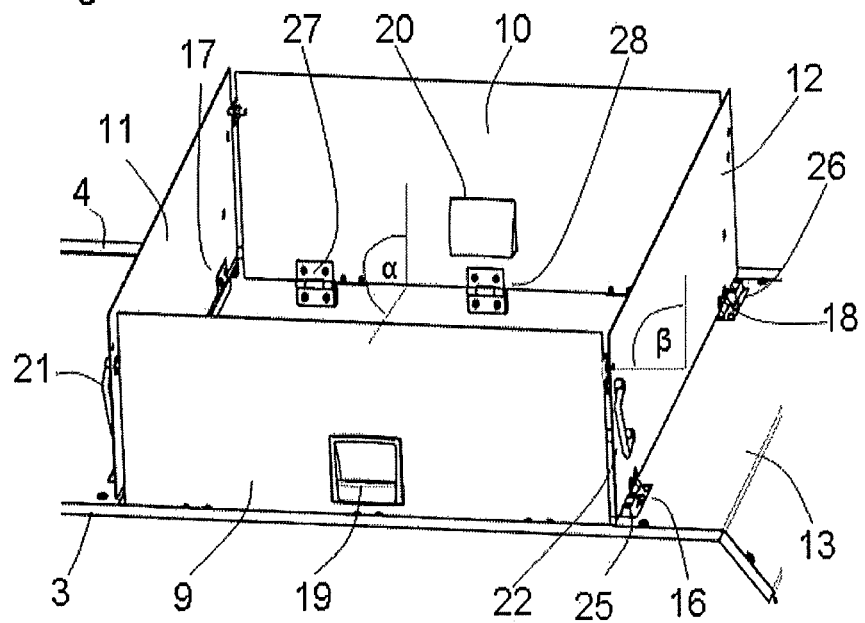
FIG. 4 shows a close-up view of the protection device from FIG. 1 in an open state.

FIG. 4 is a close-up view of the protection device 1 from FIG. 1 in an open state. The first cover elements and second cover elements 9, 10, 11, 12 are folded upwards by a radial rotary motion. Thereby, the first cover elements 9, 10 form a vertical extension of the lateral frame elements 3, 4 and the second cover elements 11, 12 connect the vertical extension formed to a safety guard enclosing the tool area lying between the fixed tool clamping plate 5 and the movable tool clamping plate 6. It can be seen that the second cover element 12 rests on the holding device 25, 26, so that the maximum opening angle β of the second cover element 12 is restricted. Such holding devices are provided also for the first cover elements 9, 10 and the further second cover element 11, which, however, are not visible due to the perspective chosen in FIG. 4. The holding devices for the first cover elements 9, 10 and the second cover elements 11, 12 are arranged such that the opening angle α of the first cover elements 9,10 and β of the second cover elements 11, 12 lie in the preferred range between 91° and 100°.

Figure 5:
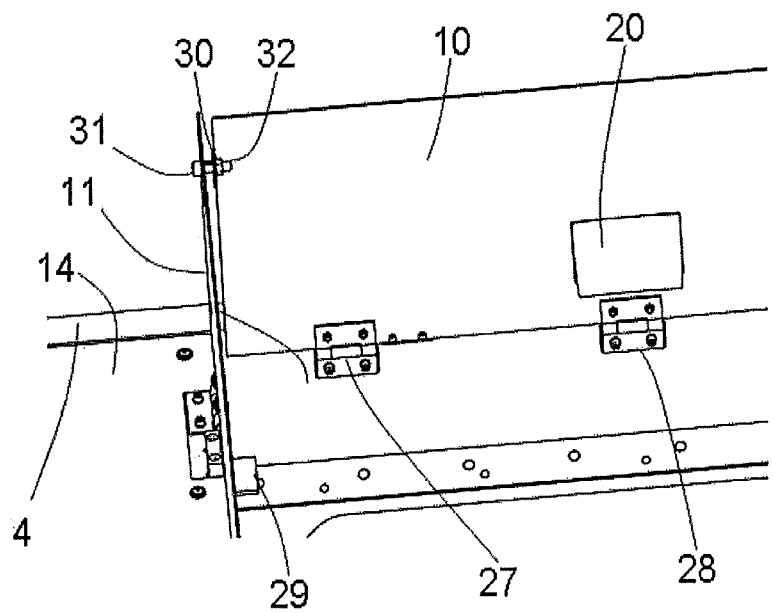
FIG. 5 shows a close-up view of a transition from a first cover element to a second cover element.

FIG. 5 shows a close-up view of a transition from a first cover element 10 to a second cover element 11. A holding device 29 is affixed on the protection panel 14, which limits the radial movement path of the first cover element 10 towards the tool area. The holding device 29 is positioned such that the first cover element 10, when resting on the holding device 29 in the closed state of the protection device 1, lies rectangular to the inside of the lateral frame element 4 facing the tool area. The first cover element 10 presents a locking device 30 configured in the form of a lug on its horizontal end adjacent to its second cover element 11. The first cover element 10 and the second cover element 11 can be locked to each other by means of a simple nut and bolt connection via the locking device 30.

Figure 6:
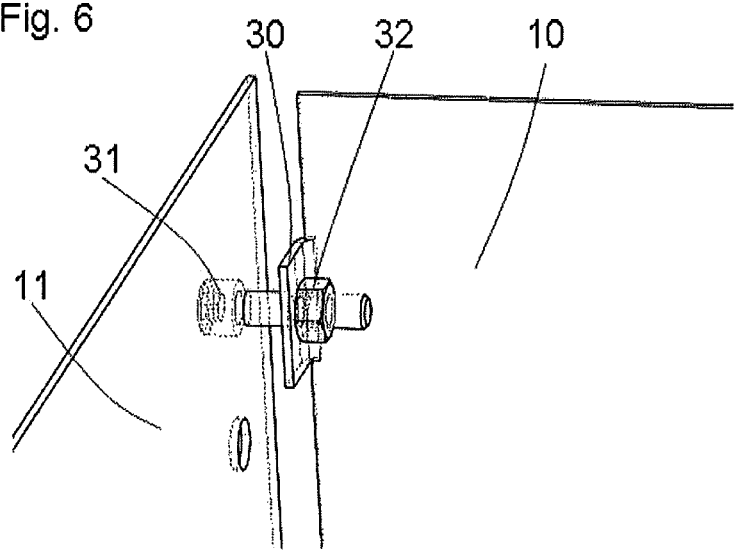
FIG. 6 shows a further close-up view of the transition from FIG. 5.

FIG. 6 is a further close-up view of the transition from FIG. 5. It can be seen that the first cover element 10 and the second cover element 11 are locked to each other via the locking device 30 and a drill in the second cover element 11 by means of a screw 31 and a bolt 32. In this manner, it is guaranteed that the protection device 1 forms a rigid system and that the shocks generated by the movable machine parts of the injection moulding machine 2 have no negative effects on the protection device 1 during the injection moulding process.

The invention claimed is:

1. An injection moulding machine comprising a fixed tool clamping plate, a movable tool clamping plate and a protection device comprising lateral frame elements or lateral covers, wherein the fixed tool clamping plate and the movable tool clamping plate are arranged between the lateral frame elements or the lateral covers and the movable tool clamping plate is configured to travel along a closing axis which runs parallel to the lateral frame elements or lateral covers in relation to the fixed tool clamping plate, wherein the protection device further comprises a number of first cover elements fixed to a top side of the lateral frame elements or lateral covers such that the first cover elements are arranged on the top side of the injection moulding machine, both on an operator side as well as on an operator opposite side opposite the operator side, the first cover elements extending parallel to the closing axis, wherein the first cover elements are configured to move radially between a closed state and an open state with respect to the lateral frame elements or lateral covers, and wherein the protection device further comprises a number of second cover elements fixed to the top side of the lateral frame elements or lateral covers such that the second cover elements are arranged on the top side of the injection moulding machine, wherein the second cover elements are arranged to extend perpendicularly to the closing axis and are configured to move radially between a closed state and an open state with respect to the lateral frame elements or lateral covers.

2. The injection moulding machine according to claim 1, wherein the first cover elements and/or the second cover elements are fixed to the lateral frame elements or lateral covers by connection elements.

3. The injection moulding machine according to claim 1, wherein traverses, struts and/or panels are provided between the lateral frame elements or lateral covers, the traverses, struts and/or panels serve for fixing the first cover elements and/or the second cover elements.

4. The injection moulding machine according to claim 3, wherein the fixing of the first cover elements and/or the second cover elements to the traverses, struts or panels takes place by connection elements.

5. The injection moulding machine protection device according to claim 2, wherein the connection elements are configured such that the connection elements facilitate the radial movement of the first cover elements and the second cover elements.

6. The injection moulding machine according to claim 1, wherein holding devices are provided on the lateral frame elements or the lateral covers, wherein the holding devices are configured such that the holding devices form contact surfaces for the first cover elements and/or the second cover elements.

7. The injection moulding machine according to claim 3, wherein holding devices are provided on the traverses, struts or panels, wherein the holding devices are configured such that the holding devices form contact surfaces for the first cover elements and/or the second cover elements.

8. The injection moulding machine according to claim 1, wherein the first cover elements and the second cover elements are made of steel plate.

9. The injection moulding machine according to claim 1, wherein the first cover elements and/or the second cover elements have handling devices.

10. The injection moulding machine according to claim 1, wherein the first cover elements and/or the second cover elements have locking devices.

* * * * *